(12) United States Patent
Chen et al.

(10) Patent No.: US 7,757,010 B2
(45) Date of Patent: Jul. 13, 2010

(54) SYSTEMS AND METHODS FOR MANAGING MASS STORAGE DEVICES IN ELECTRONIC DEVICES

(75) Inventors: Chia Jung Chen, Taipei Hsien (TW); Shih-Chang Hu, Hsin-Chu (TW); Kuan-Sheng Hsueh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 250 days.

(21) Appl. No.: 11/457,040

(22) Filed: Jul. 12, 2006

(65) Prior Publication Data

US 2007/0255860 A1      Nov. 1, 2007

Related U.S. Application Data

(60) Provisional application No. 60/745,860, filed on Apr. 28, 2006.

(51) Int. Cl.
G06F 3/00       (2006.01)
G06F 9/445      (2006.01)

(52) U.S. Cl. .................. 710/8; 710/14; 710/62; 710/72; 717/174; 717/175

(58) Field of Classification Search ............... 710/8, 710/14, 62, 72; 717/174, 175
See application file for complete search history.

(56) References Cited

U.S. PATENT DOCUMENTS

| | | | |
|---|---|---|---|
| 5,974,474 A * | 10/1999 | Furner et al. | 710/8 |
| 6,154,789 A * | 11/2000 | Grieff et al. | 710/14 |
| 6,728,787 B1 * | 4/2004 | Leigh | 719/327 |
| 7,275,118 B2 * | 9/2007 | Ytterstrom | 710/8 |
| 2002/0069353 A1 * | 6/2002 | Smith | 713/1 |
| 2003/0131150 A1 * | 7/2003 | Sugiura | 709/321 |
| 2004/0267987 A1 | 12/2004 | Deng et al. | 710/74 |
| 2005/0081099 A1 * | 4/2005 | Chang et al. | 714/15 |
| 2005/0132352 A1 * | 6/2005 | Shen | 717/174 |
| 2006/0101122 A1 * | 5/2006 | Ishii | 709/206 |
| 2006/0164324 A1 * | 7/2006 | Polivy et al. | 345/1.1 |
| 2006/0200493 A1 * | 9/2006 | Shih | 707/104.1 |
| 2006/0224780 A1 * | 10/2006 | Saito | 710/8 |

FOREIGN PATENT DOCUMENTS

JP        2004213661 A  *   7/2004

OTHER PUBLICATIONS

"Che-ez! Moni-Me Review" from www.johnvey.com/features/monime, first published in 2004.*
"User Guide for Nokia PC Suite 6.7".

* cited by examiner

*Primary Examiner*—Henry W. H. Tsai
*Assistant Examiner*—Steven G Snyder
(74) *Attorney, Agent, or Firm*—Thomas, Kayden, Horstemeyer & Risley

(57) ABSTRACT

Methods for managing mass storage devices are provided. An embodiment of a method for managing mass storage devices performed by an electronic device comprises the following steps. It is detected that the electronic device has connected to a computer system. One mass storage driver is selected from multiple mass storage drivers. Information regarding that the selection of the mass storage driver is transmitted to the computer system, thereby directing the computer system to activate the selected mass storage driver.

22 Claims, 15 Drawing Sheets

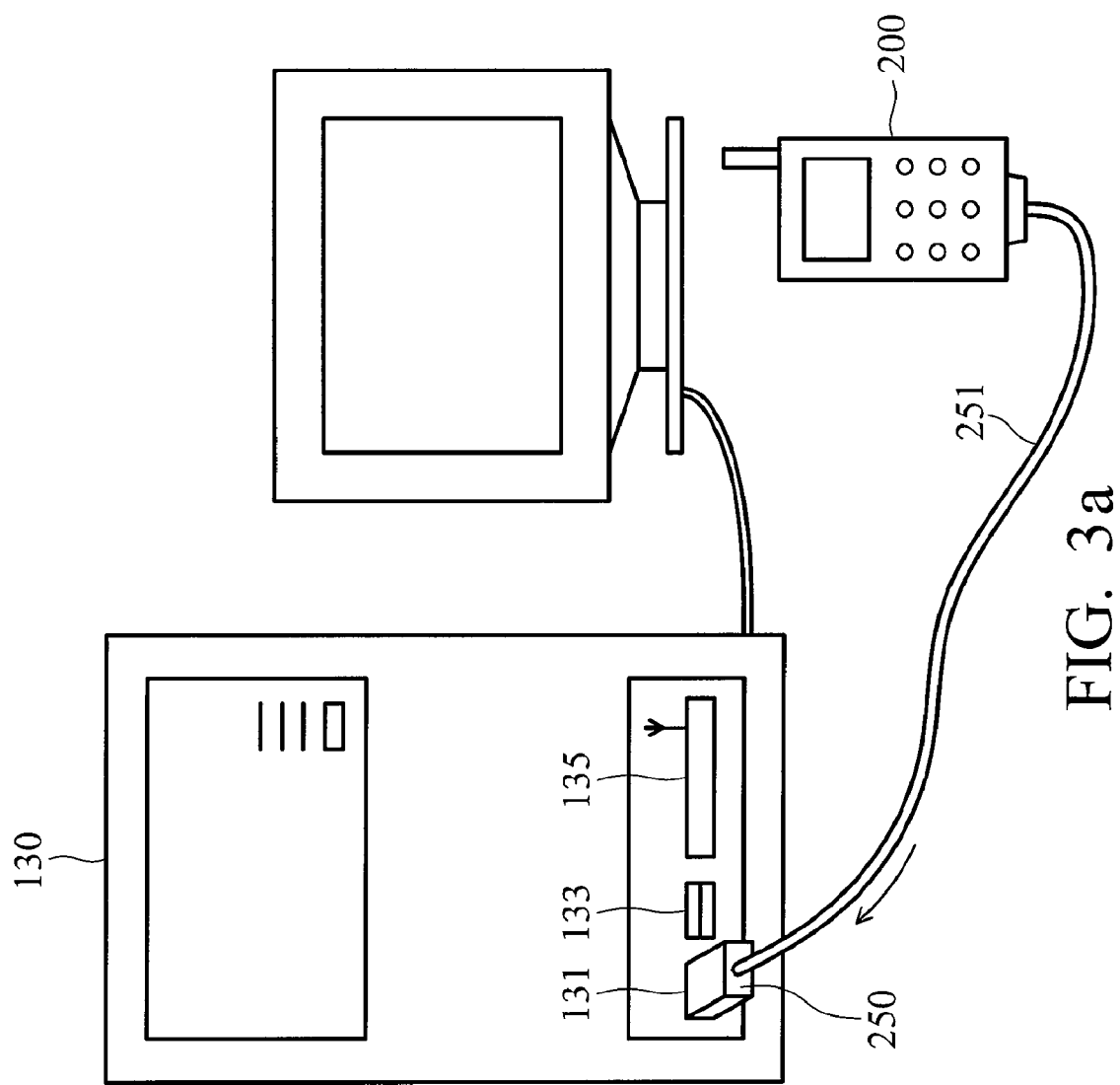

| Offset | Field | Size | Value | |
|---|---|---|---|---|
| 0 | bLength | 1 | Number | |
| 1 | bDescriptorType | 1 | Constant | |
| 2 | bcdUSB | 2 | BCD | |
| 4 | bDeviceClass | 1 | Class | ~F7101 |
| 5 | bDeviceSubClass | 1 | SubClass | ~F7102 |
| 6 | bDeviceProtocol | 1 | Protocol | ~F7103 |
| 7 | bMaxPacketSize0 | 1 | Number | |
| 8 | idVendor | 2 | ID | ~F7104 |
| 10 | idProduct | 2 | ID | ~F7105 |
| 12 | bcdDevice | 2 | BCD | |
| 14 | iManufacturer | 1 | Index | |
| 15 | iProduct | 1 | Index | |
| 16 | iSerialNumber | 1 | Index | |
| 17 | bNumConfigurations | 1 | Number | |

FIG. 7a

| Offset | Field | Size | Value |
|---|---|---|---|
| 0 | bLength | 1 | Number |
| 1 | bDescriptorType | 1 | Constant |
| 2 | wTotalLength | 2 | Number |
| 4 | bNumInterfaces | 1 | Number |
| 5 | bConfigurationValue | 1 | Number |
| 6 | iConfiguration | 1 | Index |
| 7 | bmAttributes | 1 | Bitmap |
| 8 | bMaxPower | 1 | mA |

FIG. 7b

| Offset | Field | Size | Value |
|---|---|---|---|
| 0 | bLength | 1 | Number |
| 1 | bDescriptorType | 1 | Constant |
| 2 | wTotalLength | 2 | Number |
| 4 | bNumInterfaces | 1 | Number |
| 5 | bConfigurationValue | 1 | Number |
| 6 | iConfiguration | 1 | Index |
| 7 | bmAttributes | 1 | Bitmap |
| 8 | bMaxPower | 1 | mA |

FIG. 7c

| Offset | Field | Size | Value |
|---|---|---|---|
| 0 | bLength | 1 | Number |
| 1 | bDescriptorType | 1 | Constant |
| 2 | bInterfaceNumber | 1 | Number |
| 3 | bAlternateSetting | 1 | Number |
| 4 | bNumEndpoints | 1 | Number |
| 5 | bInterfaceClass | 1 | Class — F7201 |
| 6 | bInterfaceSubClass | 1 | SubClass — F7202 |
| 7 | bInterfaceProtocol | 1 | Protocol — F7203 |
| 8 | iInterface | 1 | Index |

FIG. 7d

| Offset | Field | Size | Value |
|---|---|---|---|
| 0 | bLength | 1 | Number |
| 1 | bDescriptorType | 1 | Constant |
| 2 | bEndpointAddress | 1 | Endpoint |
| 3 | bmAttributes | 1 | Bitmap |
| 4 | wMaxPacketSize | 2 | Number |
| 5 | bInterval | 1 | Number |

FIG. 7e

SYSTEMS AND METHODS FOR MANAGING MASS STORAGE DEVICES IN ELECTRONIC DEVICES

CROSS-REFERENCE TO RELATED APPLICATIONS

The present application is related to U.S. patent applications entitled "CELLULAR PHONE AND PORTABLE STORAGE DEVICE USING THE SAME", Ser. No. 11/240,251, filed Sep. 30, 2005, and entitled "CELLULAR PHONE AND PORTABLE STORAGE DEVICE USING THE SAME", Ser. No. 11/242,420, filed Sep. 30, 2005. The present application claims the benefit of U.S. provisional patent application entitled "SYSTEMS AND METHODS FOR MANAGING MASS STORAGE DEVICES IN MOBILE PHONES", Ser. No. 60/745,860, filed Apr. 28, 2006.

BACKGROUND

The invention relates to electronic devices, and more particularly, to systems and methods for managing mass storage devices in electronic devices.

Electronic devices are typically equipped with mass storage devices such as flash memory, for storing data such as memo notes, schedules, phonebook, short messages, MP3 files and emails. Data stored in the mass storage devices may be accessed by an external electronic device such as a computer, a personal digital assistant (PDA), a programmable consumer electronic device or similar. Moreover, the external electronic device may store data in the mass storage devices of electronic devices.

SUMMARY

Methods for managing mass storage devices are provided. An embodiment of a method for managing mass storage devices performed by an electronic device, such as mobile phone, personal digital assistant (PDA) or other, comprises the following steps. It is detected that the electronic device has connected to a computer system. One mass storage driver is selected from multiple mass storage drivers. Information regarding that the selection of the mass storage driver is transmitted to the computer system, thereby directing the computer system to activate the selected mass storage driver.

Electronic devices for managing mass storage devices thereof are provided. An embodiment of an electronic device comprises a non-volatile storage device and a processing unit. The processing unit, coupling to the non-volatile storage device, detects that the electronic device has connected to a computer system, selects one mass storage driver from multiple mass storage drivers and transmits information regarding that the selection of the mass storage driver to the computer system, thereby directing the computer system to activate the selected mass storage driver.

BRIEF DESCRIPTION OF THE DRAWINGS

The invention can be more fully understood by reading the subsequent detailed description and examples with references made to the accompanying drawings, wherein:

FIG. 3a is a diagram of a mobile phone connecting to a computer host via a connector;

FIG. 7a is a diagram of the data structure of an exemplary device descriptor;

FIG. 7b is a diagram of the data structure of an exemplary configuration descriptor;

FIG. 7c is a diagram of the data structure of an exemplary other_speed_configuration descriptor;

FIG. 7d is a diagram of the data structure of an exemplary interface descriptor;

FIG. 7e is a diagram of the data structure of an exemplary endpoint descriptor;

DETAILED DESCRIPTION

Figure 1:
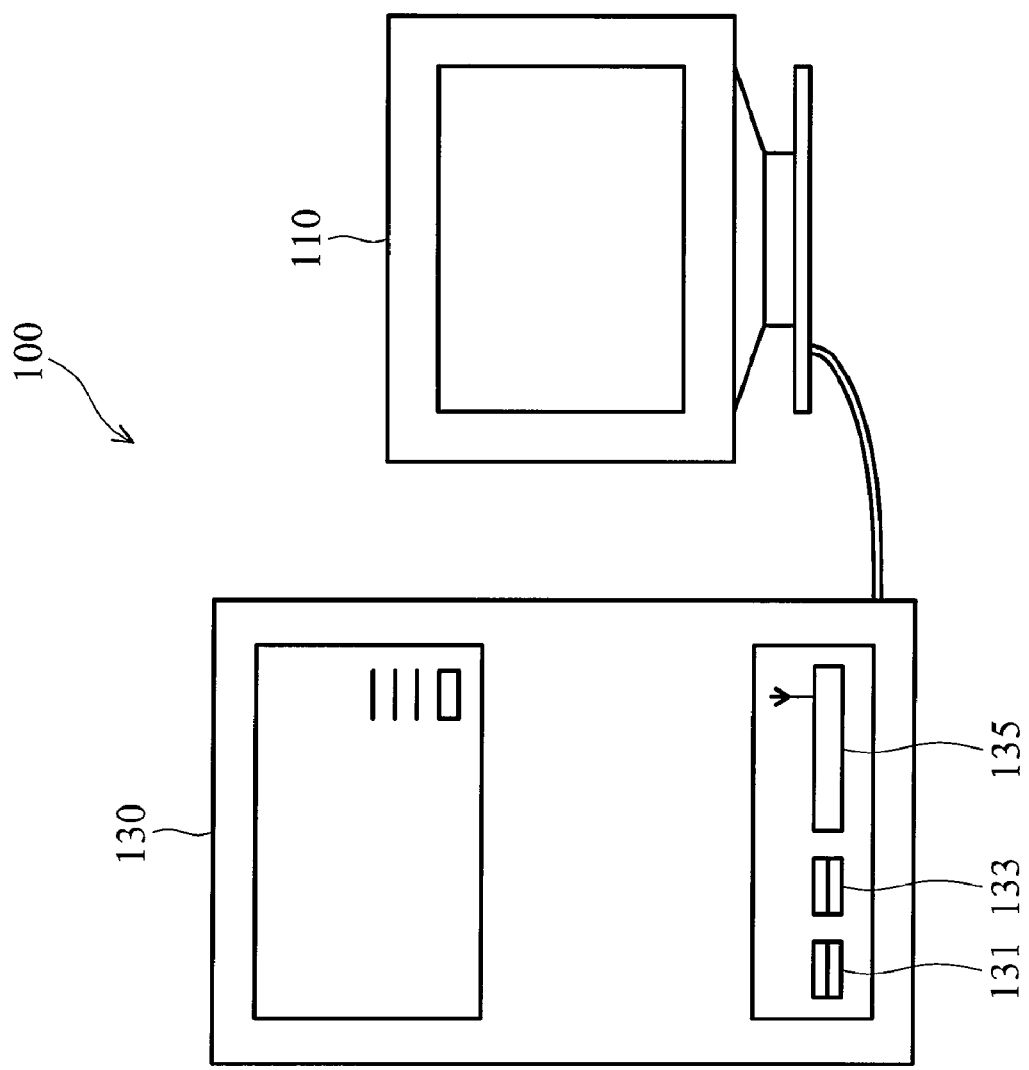
FIG. 1 is a diagram of an embodiment of a computer.

FIG. 1 is a diagram of an embodiment of a computer 100 containing a display 110 and a computer host 130. The computer host 130 is typically equipped with at least one connection port such as 131 and 133 or at least one wireless transceiver 135 capable of coupling to a mobile phone. The connection port may be a serial port or a parallel port. A serial port, such as a RS232, RS242, Serial ATA (SATA), Universal Serial Bus (USB), IEEE 1394 or Universal Asynchronous Receiver Transmitter (UART) port or similar, is an interface on a computer system by which information is transferred in or out one bit at a time. A parallel port, such as an Integrated Drive Electronics (IDE), Small Computer System Interface (SCSI), IEEE 1284 port or similar, is an interface on a computer system where data is transferred in or out in parallel, that is, on more than one wire. A parallel port carries one bit on each wire thus multiplying the transfer rate obtainable over a single cable (contrast serial port). There are usually several extra wires on the parallel port that are used for control signals to indicate when data is ready to be sent or received. A wireless transceiver, such as an 802.x, Bluetooth or Infrared Data Association (IrDA) transceiver or similar, is an interface on a computer system by which information is transferred by radio frequency or infrared signals or similar. Moreover, those skilled in the art will understand that some embodiments of the computer 100 may be practiced with other computer system configurations, including handheld devices, multiprocessor-based, microprocessor-based or programmable consumer electronics, notebooks and the like.

Figure 2:
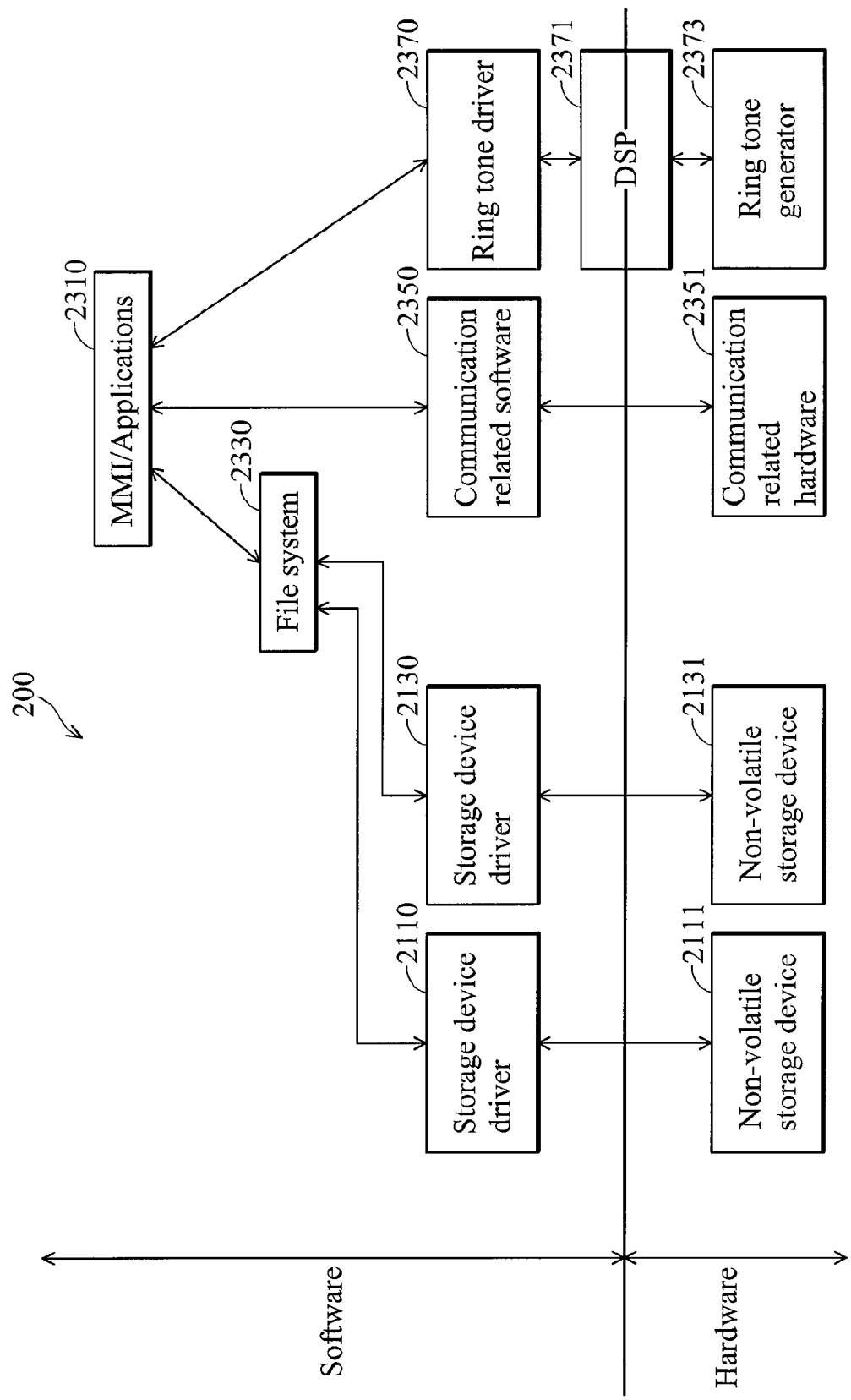
FIG. 2 is a diagram of an embodiment of the hardware and software architecture of a mobile phone.

FIG. 2 is a diagram of an embodiment of the hardware and software architecture of an electronic device 200, such as a mobile phone, personal digital assistant (PDA) or other. The electronic device 200 provides capabilities of data storage, voice data communication, ring tones and others. The electronic device 200 is equipped with a non-volatile storage device (e.g. 2111 or 2131) such as flash memory, for storing data such as memo notes, schedules, phonebooks, short messages, MP3 files and emails. It is to be understood that one non-volatile storage device must be hosted by a single controller to maintain accuracy of data retrieval. The equipped non-volatile storage device, also called a mass storage device, is hosted by a file system 2330 resident on the electronic device 200. The communication related hardware 2351 transfers/receives voice data through a wireless network such as a global system for mobile communications (GSM), enhanced data rates for global evolution (EDGE) code division multiple access (CDMA) network, general packet radio service (GPRS) network, or similar.

Figure 3B:
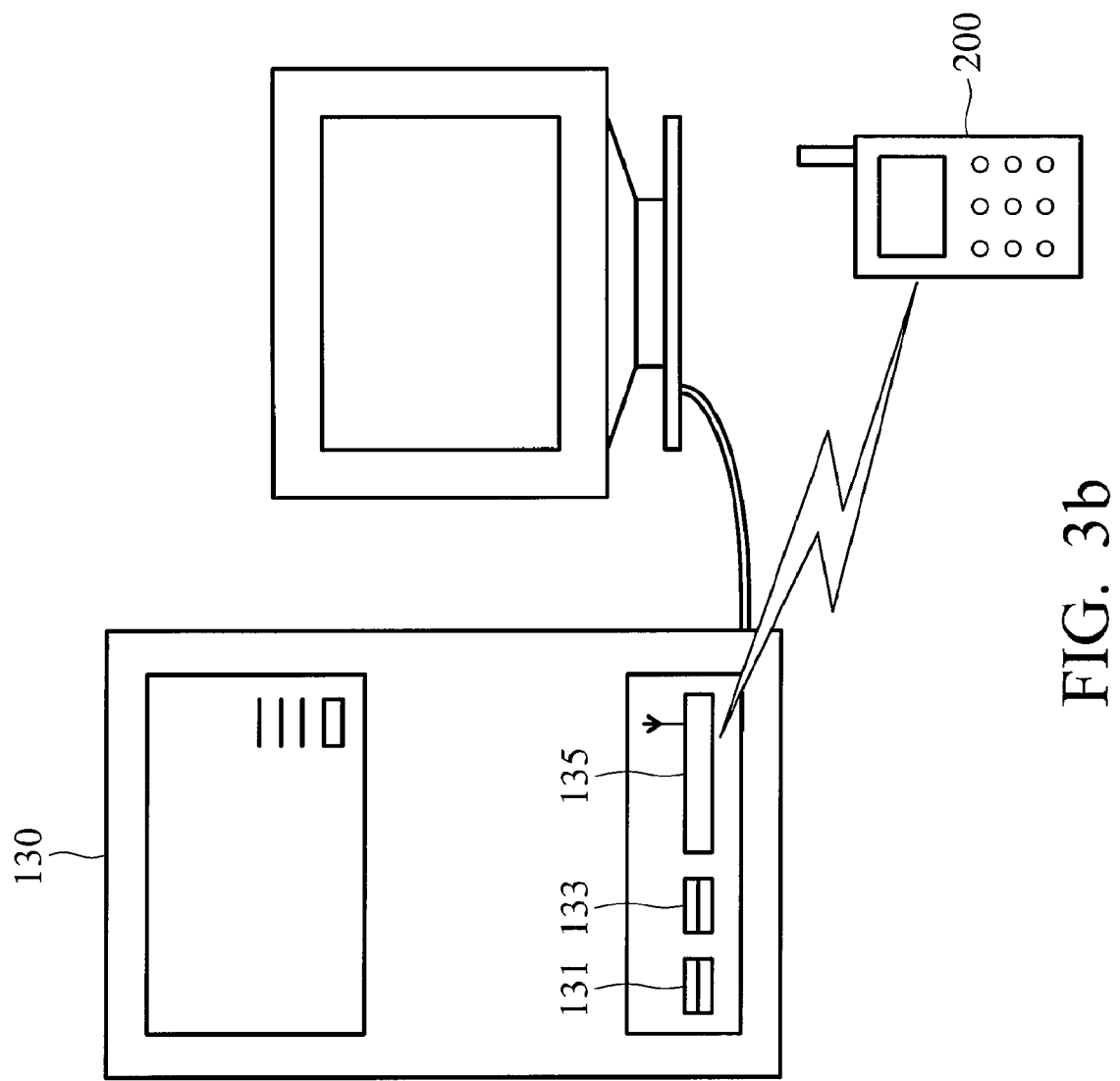
FIG. 3b is a diagram of a mobile phone coupling to a computer host by associating with a wireless transceiver.

FIG. 3a is a diagram of the electronic device 200 connecting to the computer host 130 via a connector 250, a connection wire 251 and the connection port 131. FIG. 3b is a diagram of the electronic device 200 coupling to the computer host 130 by associating with the wireless transceiver 135. When the electronic device 200 couples to the computer host 130 via the connection port 131 or the wireless transceiver 135, the computer host 130 may identify and configure the electronic device 200 as an external mass storage device by employing the universal plug and play (UPnP) protocol set forth by the UPnP forum. Thereafter, the computer host 130 can read/write data from/in a non-volatile storage device of the electronic device 200.

Figure 4:
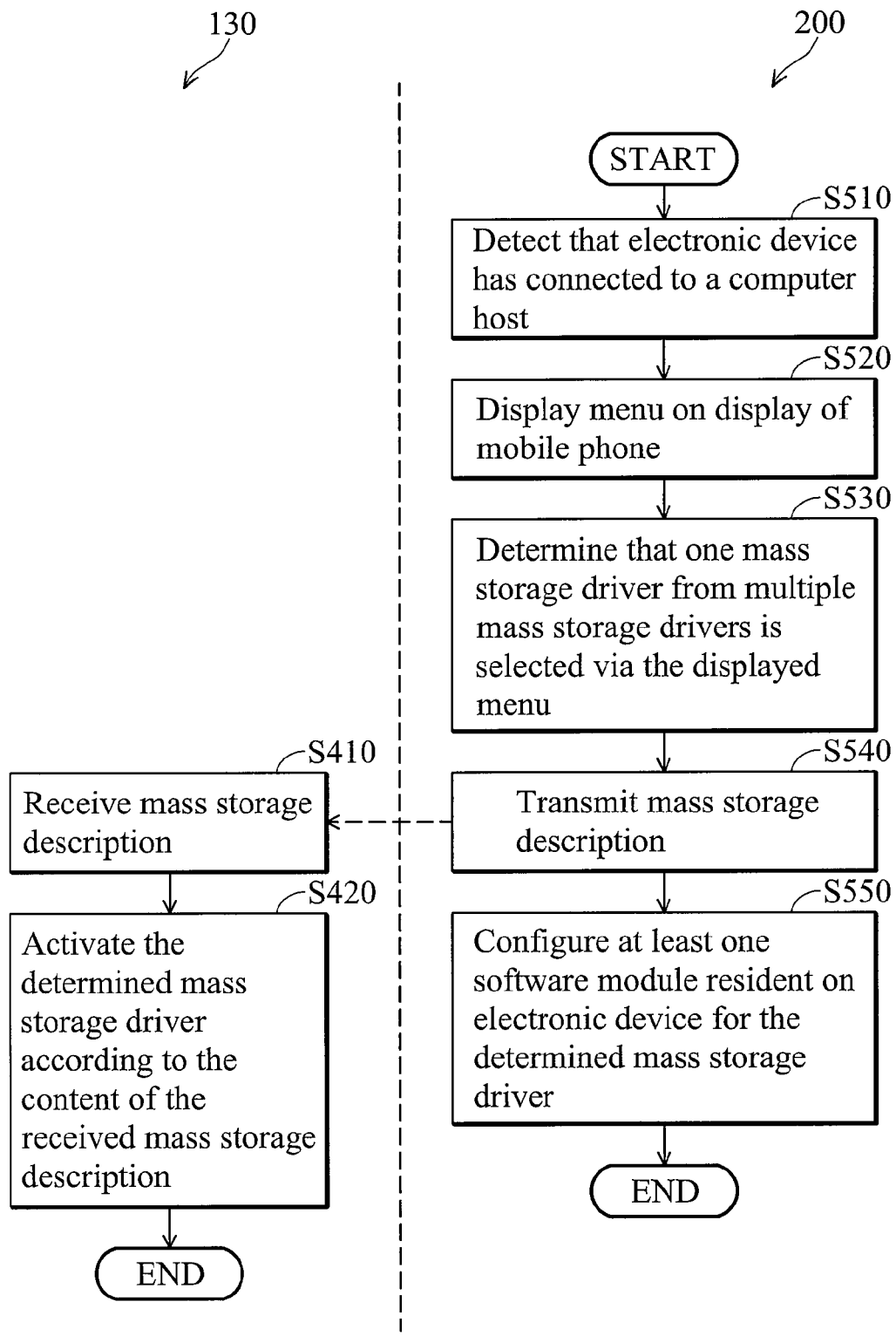
FIG. 4 is a flowchart illustrating an embodiment of a method for managing mass storage devices in a mobile phone.
Figure 5:
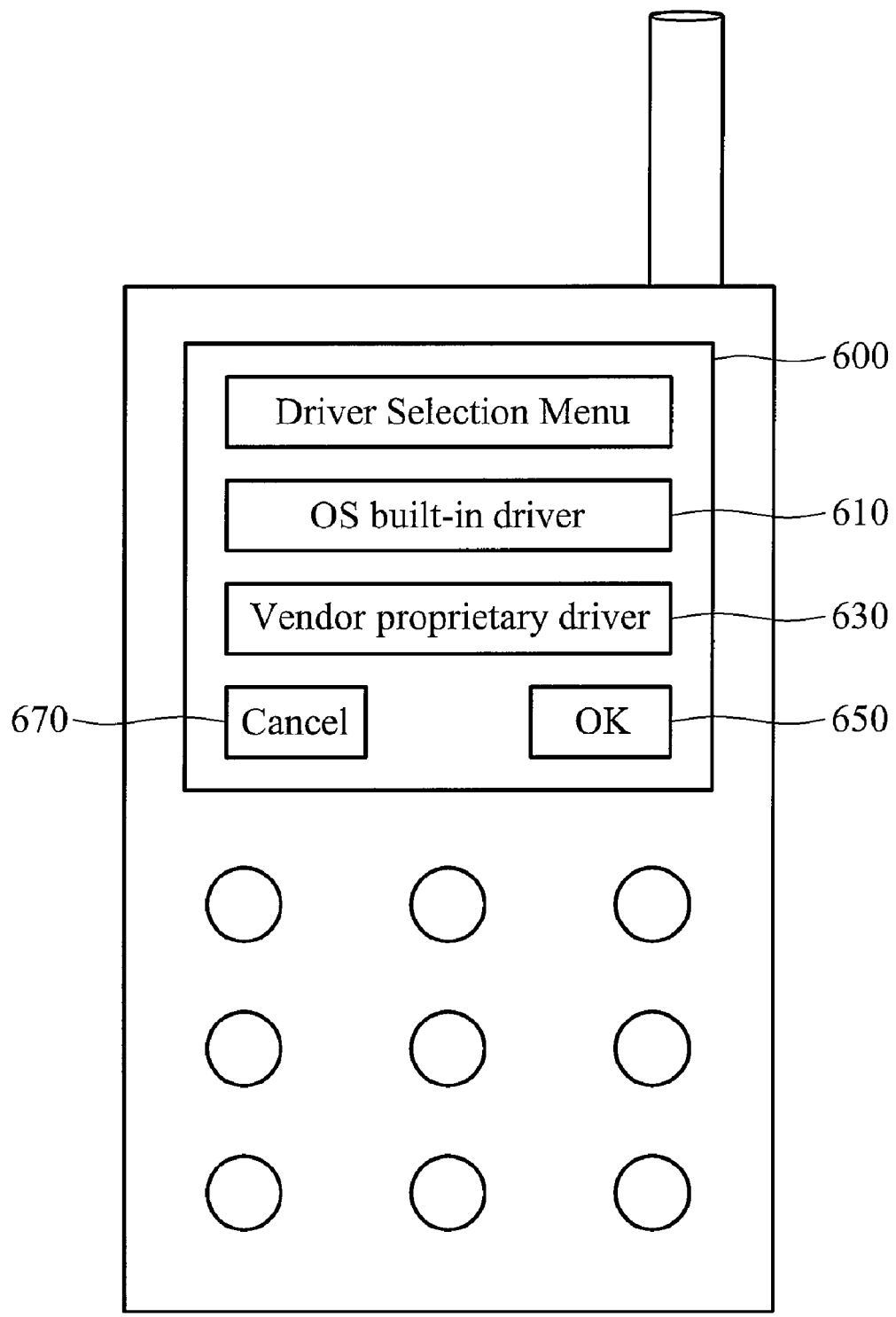
FIG. 5 is a diagram of an exemplary man-machine interface (MMI) of a menu.

FIG. 4 is a flowchart illustrating an embodiment of a method for managing mass storage devices in an electronic device, divided into two sections, a left section showing steps performed by a computer host (e.g. 130 of FIG. 3a or 3b), and a right section showing steps performed by an electronic device (e.g. 200 of FIG. 3a or 3b), separated by dashed lines for added clarity. That the electronic device has connected to the computer host is detected (step S510). For example, that the electronic device has connected to the computer host is detected when detecting high voltage through a pin $V_{bus}$ of a USB connector (similar with 250 of FIG. 3a). An MMI facilitating user determination of one mass storage driver from multiple mass storage drivers is displayed on a display of the electronic device (step S520). FIG. 5 is a diagram of an exemplary MMI of a menu 600 containing two menu items 610 and 630 and two soft keys 650 and 670. The menu item 610 displays a prompt message "OS Built-in Driver", and the menu item 630 displays a prompt message "vendor proprietary driver". It is determined that one mass storage driver is selected via the displayed MMI (step S530 of FIG. 4). Referring to FIG. 4, it is determined that a user desires to access data in a non-volatile storage device (e.g. 2111 or 2131 of FIG. 2) of the electronic device via an operating system (OS) built-in driver in the computer host when the user selects the menu item 610 and presses a key corresponding to the soft key 650. Otherwise, it is determined that a user desires to access data in a non-volatile storage device (e.g. 2111 or 2131 of FIG. 2) of the electronic device via a vendor proprietary driver in the computer host when the user selects the menu item 630 and presses a key corresponding to the soft key 650.

Figure 6:
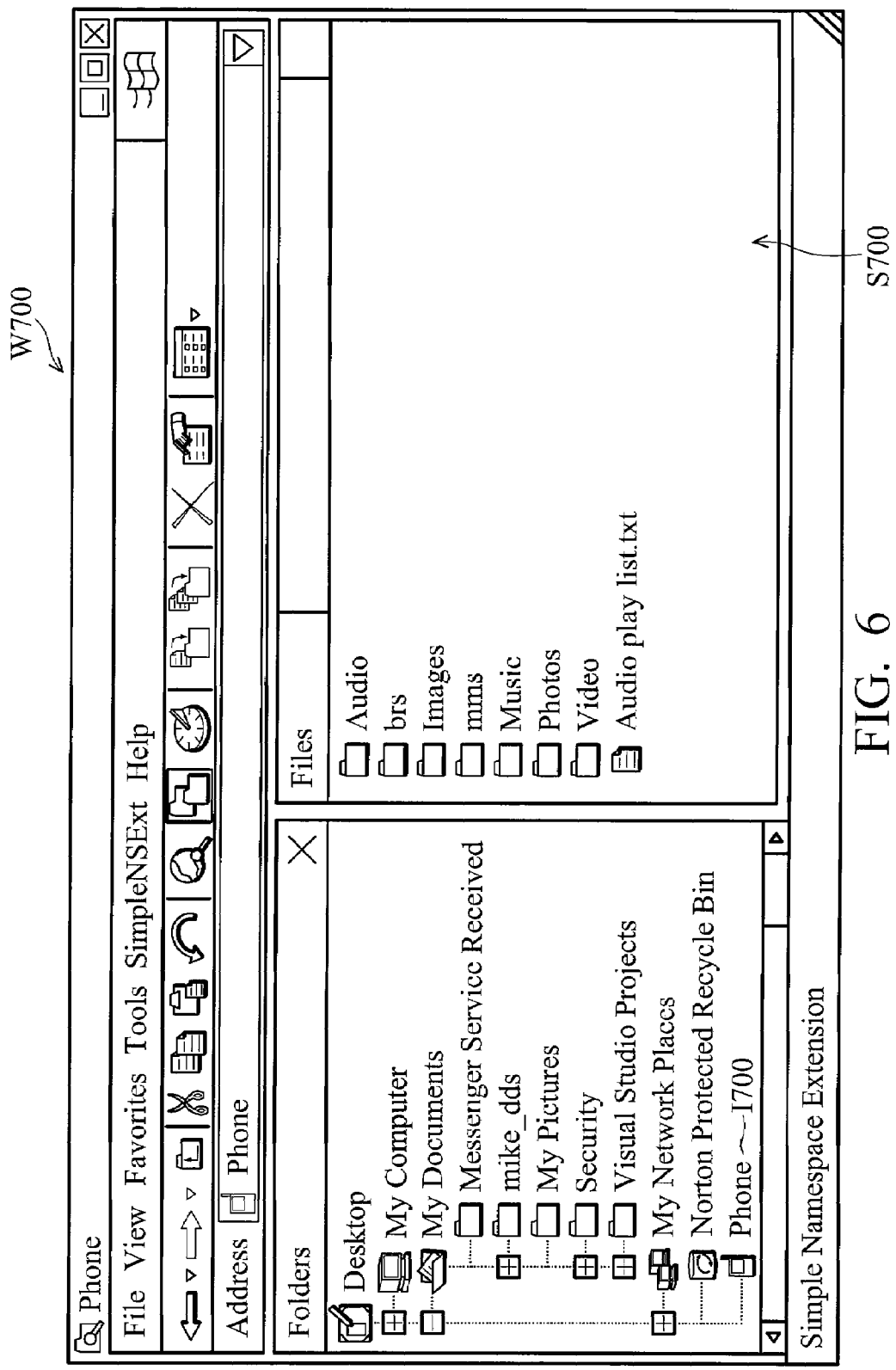
FIG. 6 is a diagram of an exemplary file manager window.

Referring to FIG. 4, mass storage description is transmitted from the electronic device (step S540), and is received by the computer host (step S410). The mass storage description may contain profile information indicating a vendor identity, product identity, device description, interface identity, or similar for configuring the electronic device. Moreover, the mass storage description contains a mass storage driver identity corresponding to the determined mass storage driver (as shown in step S530). The determined mass storage driver resident on the computer host is activated according to the content of the received mass storage description. It is to be understood that the OS built-in driver is a public driver provided by a software vendor of an OS such as Window 2000™, Windows XP™, Linux, or similar. The OS built-in driver is automatically installed while installing the OS in the computer host. The vendor proprietary driver is a native driver provided by a manufacture of the electronic device. It may require additional effort to download/load the vendor proprietary driver from a Web site in Internet, an optical disc, a portable drive or similar, and to install the vendor proprietary driver in the computer host 13. After the predetermined mass storage driver is activated, a new icon representing a non-volatile storage device of the electronic device may be added in file tree structure shown in a file manager window displayed on a screen of the computer host (e.g. 110 of FIG. 1), and acquire information regarding all directories established in the non-volatile storage device via the activated mass storage driver. FIG. 6 is a diagram of an exemplary file manager window W600, an electronic device icon I600 is shown in the file tree structure, and all directories of the first level are shown in the lower right section S600 of the file manager window W600.

After transmitting the mass storage description (step S540), at least one software module such as a command processing engine, a file system or similar, resident on the mobile is configured for the determined mass storage driver (step S550). Note that step S550 can also be performed between the steps S530 and S540.

Referring to steps S540 and S410 of FIG. 5, mass storage description is preferably carried by multiple descriptors such as "device", "configuration", "other_speed configuration", "interface" and "endpoint" descriptors set forth by universal serial bus specification revision 2.0 on Apr. 27, 2000. The device descriptor may describe general information about the coupled electronic device (e.g. 200 of FIG. 3a or 3b). FIG. 7a is a diagram of the data structure of an exemplary device descriptor containing fourteen fields. When selecting the OS built-in driver (S530 of FIG. 5), three fields "bDeviceClass" F7101, "bDeviceSubClass" F7102 and "bDeviceProtocol" F7103 are set to a preserved value "0x00" identifying that the coupled electronic device is a mass storage device. When selecting the vendor proprietary driver (S530 of FIG. 5), the described fields F7101 to F7103 are set to a preserved value "0xFF" identifying that the coupled electronic device is a vendor-specific device, and further, two fields "idVendor" F7104 and "idProduct" F7105 are set to relevant values facilitating activation of the determined vendor proprietary driver by a computer host (e.g. 130 of FIG. 3a or 3b). The configuration descriptor describes information about configurations for the coupled electronic device. FIG. 7b is a diagram of the data structure of an exemplary configuration descriptor containing eight fields. The electronic device may provide more than one configuration descriptor to the computer host, and each configuration descriptor may describe a number of interfaces. The other_speed_configuration descriptor describes a configuration of a high speed capable device, being identical to a configuration descriptor. FIG. 7c is a diagram of the data structure of an exemplary other_speed_configuration descriptor containing eight fields. The interface descriptor describes a specific interface within a configuration. FIG. 7d is a diagram of the data structure of an exemplary interface descriptor containing nine fields. When selecting the OS built-in driver (S530 of FIG. 5), three fields "bInterfaceClass" F7201, "bInterfaceSubClass" F7202 and "bInterfaceProtocol" F7203 are respectively set to preserved values "0x08", "0x06" and "0x50" indicating that the coupled electronic device supports the standard mass storage interface. When selecting the vendor proprietary driver (S530 of FIG. 5), the described fields F7201 to F7203 are set to a preserved value "0xFF" indicating that the coupled electronic device supports a vendor proprietary interface. Each interface descriptor may associate with zero or more endpoint descriptors. The endpoint descriptor contains information required by the computer host to determine the bandwidth requirements of each endpoint. FIG. 7e is a diagram of the data structure of an exemplary endpoint descriptor containing six fields.

Figure 8:
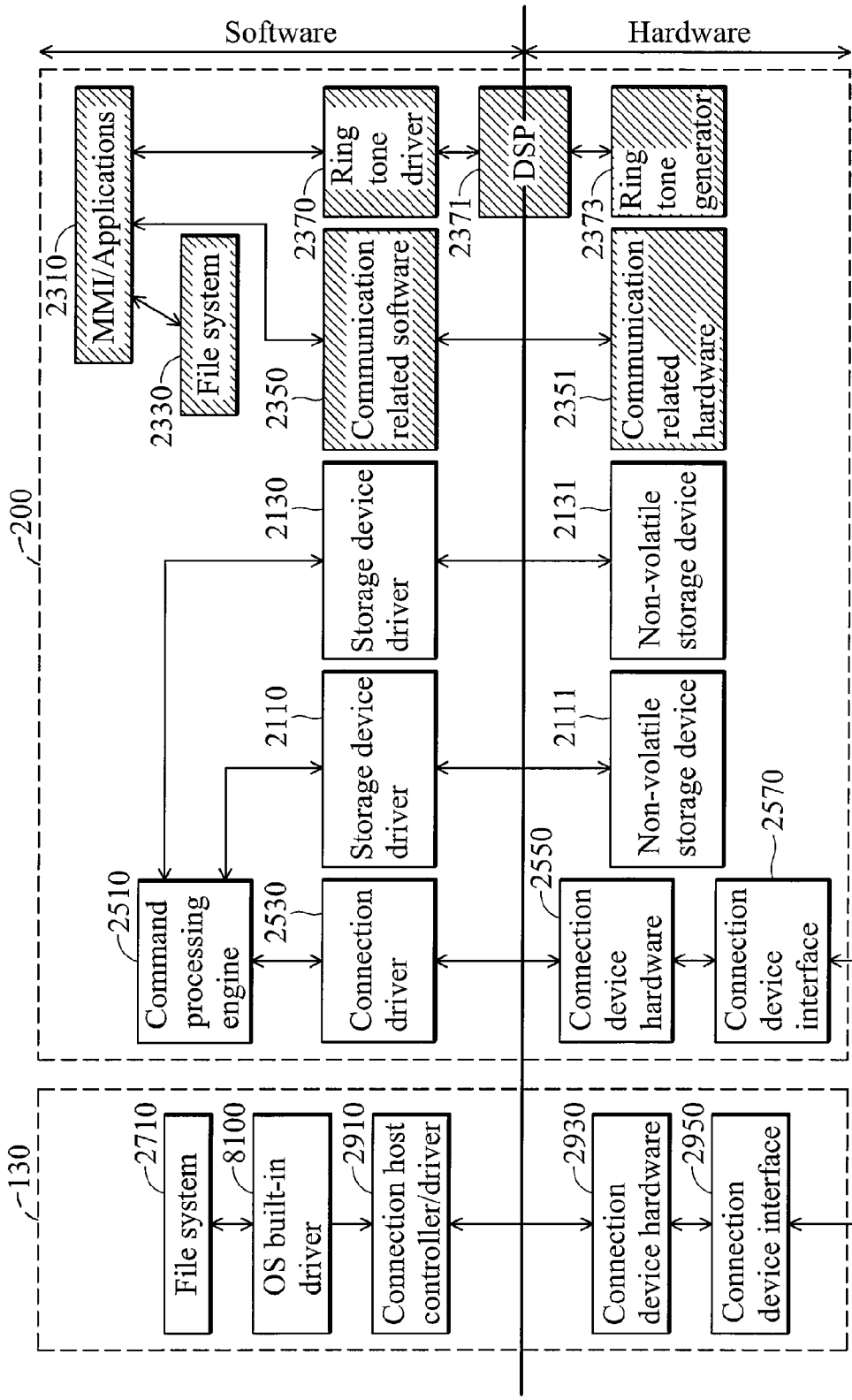
FIGS. 8 to 11 are diagrams of exemplary data access details in a mobile phone and a computer host.

Several scenarios are provided in the following. In a first scenario, when the OS built-in driver is determined, the file system resident on the electronic device (e.g. 2330 of FIG. 2) is disabled, and the command processing engine is configured to parse the conventional IDE or SCSI commands which are defined in USB mass storage class specification and to access non-volatile storage devices according to the parsed commands. When the file system resident on the electronic device is disabled, resulting in suspending data/voice transmission via communication related software and hardware (e.g. 2350 and 2351 of FIG. 2) between the electronic device and a remote electronic device. FIG. 8 is a diagram of exemplary data access details in a electronic device and a computer host. An OS built-in driver 8100 is activated. A file system 2330 resident on the electronic device 200 is disabled. A command processing engine 2510 resident on the electronic device 200 is configured to parse and convert the conventional IDE or SCSI commands into data access commands recognized by the storage device drivers 2110 and 2130 and issue the converted data access commands to the non-volatile storage driver 2110 or 2130 to read or write data from or to the non-volatile storage device 2111 or 2131. A file system 2710 resident on the computer host 130 may issue a data access command to the OS built-in driver 8100. The OS built-in driver 8100 converts the received data access command into a corresponding IDE or SCSI command and transmits the converted command to the command processing engine 2510 sequentially through a connection host controller/driver 2910, connection device hardware 2930 and a connection device interface 2950 resident on the computer host 130, and a connection device interface 2570, connection device hardware 2550 and a connection driver 2530 resident on the electronic device 200. The command processing engine 2510 subsequently converts the received IDE or SCSI into a data access command recognized by the storage device driver 2110 or 2130 and issues the converted command to the storage device driver 2110 or 2130 to read or write data from or to the non-volatile storage device 2111 or 2131.

In the first scenario, the file system resident on the electronic device is disabled, resulting in the communication related data, such as incoming-call information, phone book data, default ring tone data, and calibration data, stored in the storage device 2111 or 2131 cannot be used by the electronic device. Therefore, the communication functionality of the electronic device is disabled.

Figure 9:
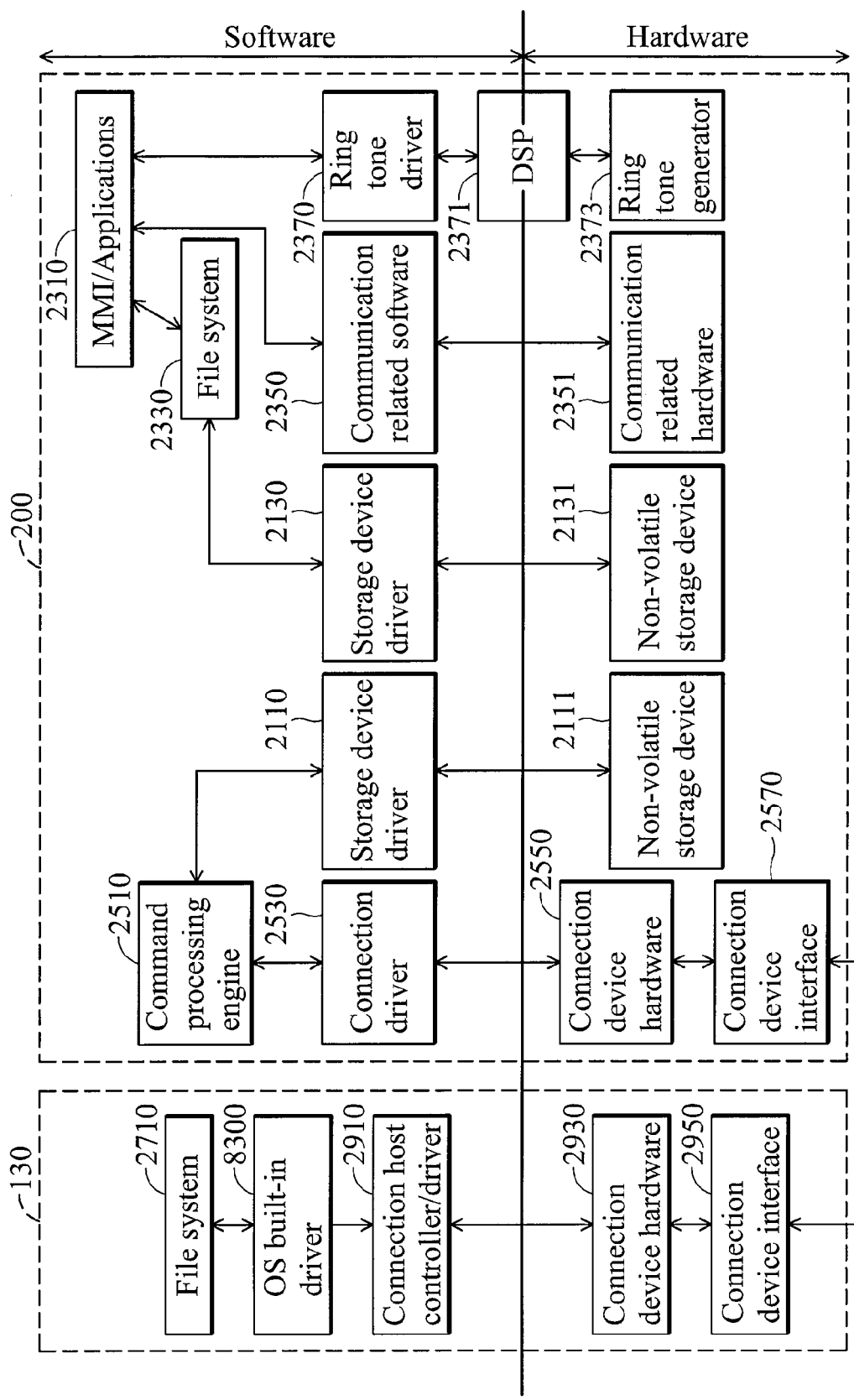

In a second scenario, when the OS built-in driver is determined, the file system resident on the electronic device (e.g. 2330 of FIG. 2) is configured to access a number of non-volatile storage devices, and the command processing engine is configured to parse the conventional IDE or SCSI commands and access the remaining number of non-volatile storage devices according to the parsed commands. FIG. 9 is a diagram of exemplary data access details in a electronic device and a computer host. An OS built-in driver 8300 is activated. The file system 2330 resident on the electronic device 200 is configured to access a non-volatile storage device 2131 via a storage device driver 2130. The command processing engine 2510 is configured to parse and convert the conventional IDE or SCSI commands into data access commands and issue the converted data access commands to a storage device driver 2110 to read or write data from or to a non-volatile storage device 2111. Similar with the first scenario, the file system 2710 resident on the computer host 130 may issue a data access command to the OS built-in driver 8300. The OS built-in driver 8300 converts the received data access command into a corresponding IDE or SCSI command and transmits the converted command to the command processing engine 2510 along the same transmission path as that present in the first scenario. The command processing engine 2510 converts the received IDE or SCSI command into a data access command recognized by the storage device driver 2110 and issues the converted command to the storage device driver 2110 to read or write data from or to the non-volatile storage device 2111. Note that voice/data communication related data such as a incoming-call information, phone book data, default ring tone data, calibration data or similar, may be stored in the non-volatile storage device 2131. Therefore, in the second scenario, the communication functionality of the electronic device will not be disabled when the electronic device is configured to be an external mass storage device of the computer host and controlled by the OS built-in driver installed in the computer host, since the communication related data is stored in the storage device 2131 to be accessed by the file system resident on the electronic device so as to be applied by the electronic device for communication with a remote electronic device.

Figure 10:
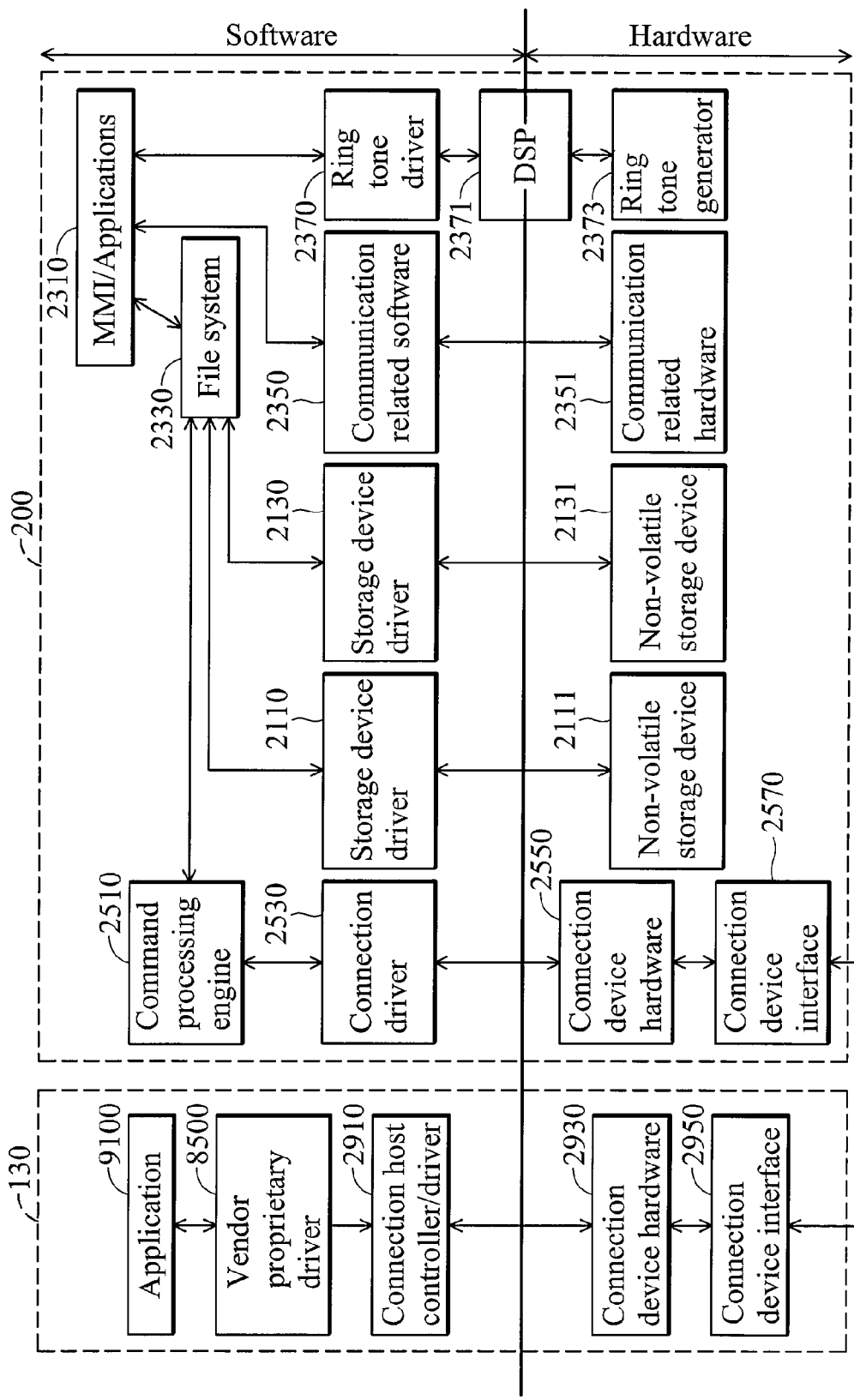

In a third scenario, when the vendor proprietary driver is determined, the command processing engine is configured to transfer data access commands received from the vendor proprietary driver to a file system resident on the electronic device (e.g. 2330 of FIG. 2) and access non-volatile storage devices via the file system. Note that, when the command processing engine is configured to access non-volatile storage devices via the file system, all data/voice communication functions such as making a phone call, answering an incoming phone call and others, provided by the electronic device are maintained. FIG. 10 is a diagram of exemplary data access details in a electronic device and a computer host. A vendor proprietary driver 8500 is activated. A command processing engine 2510 resident on the electronic device 200 is configured to transfer data access commands recognized by a file system 2330 resident on the electronic device 200 to read or write data from or to the non-volatile storage 2111 or 2131. An application 9100 resident on the computer host 130 may issue a first data access command to the vendor proprietary driver 8500. The vendor proprietary driver 8500 converts the received first data access command into a second data access command recognized by the file system 2330 and transmits the converted command to the command processing engine 2510 along the same path as that present in the first scenario. The command processing engine 2510 transfers the received second data access command to the file system 2330. The file system 2330 converts the received second data access command into a third data access command recognized by the storage device driver 2110 or 2130 and issues the converted third data access command to the storage device driver 2110 or 2130 to read or write data from or to the non-volatile storage device 2111 or 2131. Note that the MMI/Applications 2310 reads or writes data from or to the non-volatile storage devices 2111 and 2131 via the file system 2330 during data/voice communication between the electronic device 200 and a remote electronic device.

Figure 11:
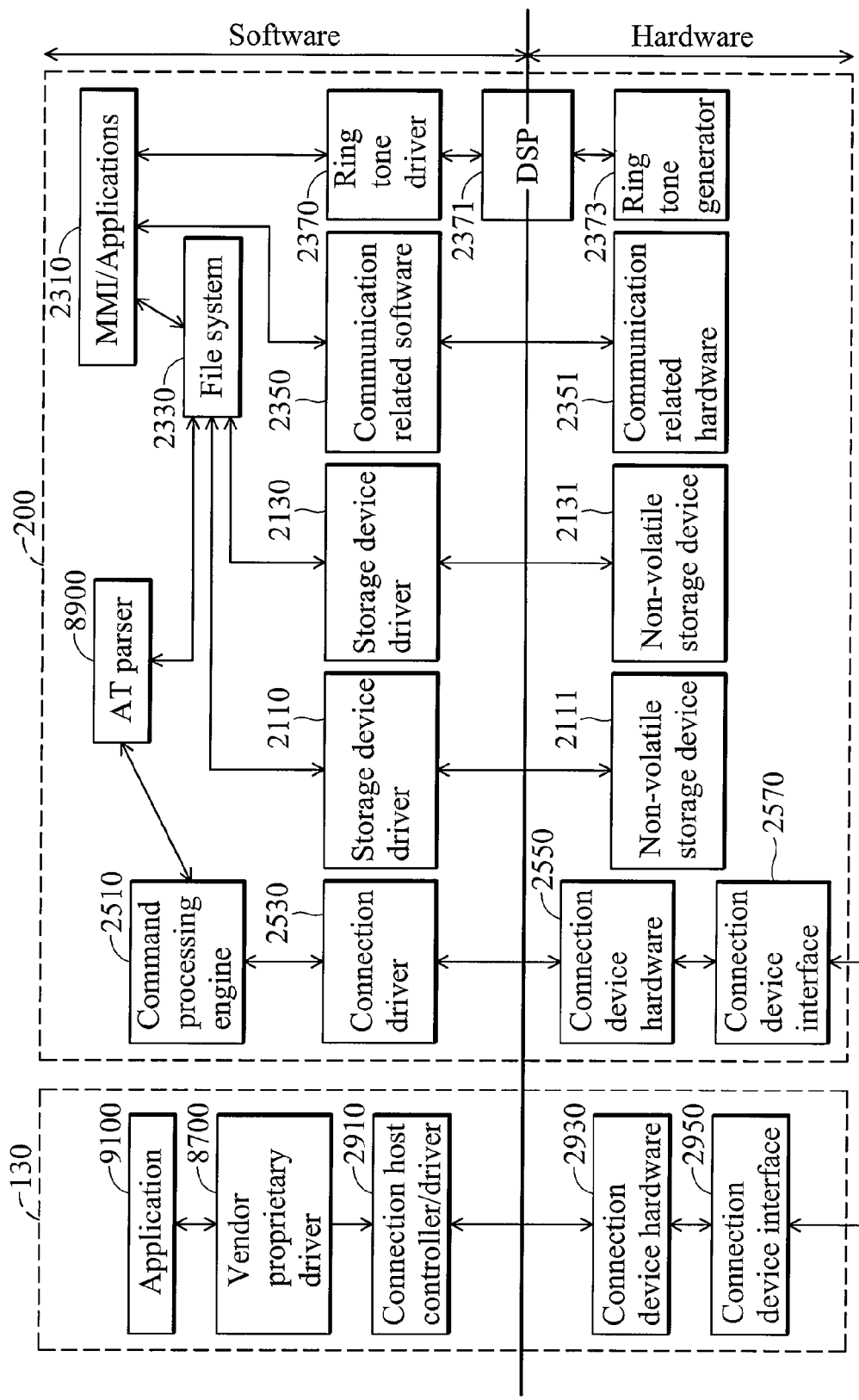

In a fourth scenario, when the vendor proprietary driver is determined, the command processing engine is configured to transfer AT commands set forth by 3GPP TS 27.007 version 5.1.0 release 5 in March 2002 and received from the vendor proprietary driver to a AT parser resident on the electronic device and access non-volatile storage devices via the AT parser and a file system resident on the electronic device. Note that, when the command processing engine is configured to access non-volatile storage devices via the AT parser and the file system, all data/voice communication functions such as making a phone call, answering an incoming phone call and others, provided by the electronic device are maintained. In some embodiment, the command parsing engine can be omitted so that AT commands are directly transferred to the AT parser from the connection driver. FIG. 11 is a diagram of exemplary data access details in a electronic device and a computer host. A vendor proprietary driver 8700 is activated. A command processing engine 2510 resident on the electronic device 200 is configured to transfer AT commands recognized by a AT parser 8900 resident on the electronic device 200 to read or write data from or to the non-volatile storage 2111 or 2131. An application 9100 resident on the computer host 130 may issue a first data access command to the vendor proprietary driver 8700. The vendor proprietary driver 8700 converts the received first data access command into an AT command recognized by the AT parser 8900 and transmits the converted command to the command processing engine 2510 along the same path as that present in the first scenario. It is to be understood that, it the described scenarios, the MMI/applications 2310, file system 2330, communication related software 2350, ring tone driver 2370, firmware of the DSP 2371, command processing engine 2510, connection driver 2530, and storage device drivers 2110 and 2130 comprise computer code, which are executed and configured by a processing unit of the electronic device 200.

Figure 12:
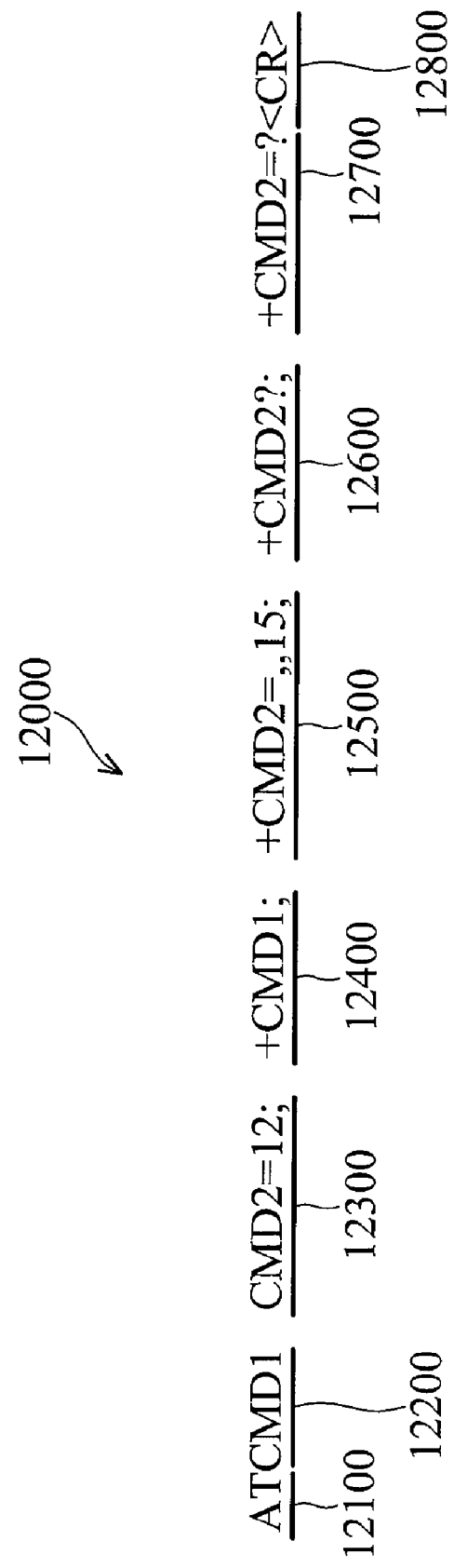
FIG. 12 is a diagram of general structure of an AT command line.

FIG. 12 is a diagram of general structure of an AT command line 12000. The AT command line starts with a prefix "AT" 12100 followed by at least one basic AT command such as 12200 and 12300 and ends with termination characters "<CR>" 12700. Extended AT commands are prefixed with "+", such as 12400 and 12500 and others, and delimited with semicolons. The basic or extended AT command may have one or more subparameters. The command line 12000 may contain a read command trailing "?", such as 12600, for checking current subparameter values for an AT extended command. The command line 12000 may contain a test command trailing "=?", such as 12700, for checking possible subparameter values for an AT extended command.

The command processing engine 2510 transfers the received AT command to the AT parser 8900. The AT parser 8900 parses and converts the AT command into a second data access command recognized by the file system 2300 and issues the converted data access command to the file system 2300. The file system 2330 converts the received second data access command into a third data access command recognized by the storage device driver 2110 or 2130 and issues the converted third data access command to the storage device driver 2110 or 2130 to read or write data from or to the non-volatile storage device 2111 or 2131. Note that the MMI/Applications 2310 reads or writes data from or to the non-volatile storage devices 2111 and 2131 via the file system 2330 during data/voice communication between the electronic device 200 and a remote electronic device.

Note that voice/data communication related data such as a incoming-call information, phone book data, default ring tone data, calibration data or similar, may be stored in the non-volatile storage device 2131. Therefore, in the third and fourth scenarios, the communication functionality of the electronic device will not be disabled when the electronic device is configured to be an external mass storage device of the computer host and controlled by the vendor proprietary driver 8500 or 8700 installed in the computer host, since the communication related data is stored in the storage device 2131 to be accessed by the file system 2330 resident on the electronic device so as to be applied by the electronic device for communication with a remote electronic device.

Methods for managing mass storage devices in mobile stations, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method, performed by a peripheral electronic device, for managing mass storage devices, the method comprising:
    the peripheral electronic device detecting that the peripheral electronic device has connected to a computer system;
    the peripheral electronic device generating a man-machine interface (MMI) comprising a plurality of displayed menu items of the peripheral electronic device, each corresponding to one of a plurality of mass storage drivers pre-stored in the computer system, wherein the mass storage drivers comprise an operating system (OS) built-in driver and a vendor proprietary driver;
    the peripheral electronic device determining one of the mass storage drivers via the MMI;
    the peripheral electronic device transmitting a first configuration descriptor identifying the connected peripheral electronic device as a mass storage device to direct the computer system to activate the OS built-in mass storage driver when determining the OS built-in driver; and
    the peripheral electronic device transmitting a second configuration descriptor identifying the connected peripheral electronic device as a vendor-specific device to direct the computer system to activate the vendor proprietary mass storage driver when determining the vendor proprietary driver,
    thereby enabling the computer system to read or write data from or to a non-volatile storage device disposed on the peripheral electronic device via the activated mass storage driver.

2. The method as claimed in claim 1 further comprising configuring at least one software module resident on the peripheral electronic device for the determined mass storage driver.

3. The method as claimed in claim 2 wherein the configuring step further comprises:
    disabling a file system resident on the peripheral electronic device to prevent the file system from reading or writing data from or to a non-volatile storage device disposed on the peripheral electronic device; and configuring a command processing engine resident on the peripheral electronic device to parse and convert a small computer system interface (SCSI) or an integrated device electronics (IDE) command received from the activated mass storage driver into a data access command recognized by a storage device driver corresponding to the non-volatile storage device and to issue the converted data access command to the storage device driver to read or write data from or to the non-volatile storage device.

4. The method as claimed in claim 3 wherein data/voice communication between the peripheral electronic device and a remote electronic device is disabled when the file system is disabled.

5. The method as claimed in claim 2 wherein the configuring step further comprises:

configuring a file system resident on the peripheral electronic device to read or write data from or to a first non-volatile storage device disposed on the peripheral electronic device; and configuring a command processing engine resident on the peripheral electronic device to parse and convert a small computer system interface (SCSI) or an integrated device electronics (IDE) command received from the activated mass storage driver into a data access command recognized by a storage device driver corresponding to a second non-volatile storage device and to issue the converted data access command to the storage device driver to read or write data from or to the second non-volatile storage device disposed on the peripheral electronic device.

6. The method as claimed in claim 2 wherein the configuring step further comprises:

configuring a command processing engine resident on the peripheral electronic device to transfer a data access command, which is recognized by a file system resident on the peripheral electronic device and received from the activated mass storage driver to the file system, thereby enabling the file system to read or write data from or to a non-volatile storage device disposed on the peripheral electronic device according to the transferred data access command.

7. The method as claimed in claim 6 wherein a man-machine interface (MMI) or an application reads or writes data from or to the non-volatile storage device via the file system during data/voice communication between the peripheral electronic device and a remote electronic device.

8. The method as claimed in claim 2 wherein the configuring step further comprises:

configuring a command processing engine resident on the peripheral electronic device to transfer an Advanced Technology (AT) command received from the activated mass storage driver to an AT parser resident on the peripheral electronic device, enabling the AT parser to parse and convert the AT command into a data access command and direct a file system resident on the peripheral electronic device to read or write data from or to a non-volatile storage device disposed on the peripheral electronic device according to the converted data access command.

9. The method as claimed in claim 8 wherein a man-machine interface (MMI) or an application reads or writes data from or to the non-volatile storage device via the file system during data/voice communication between the peripheral electronic device and a remote electronic device.

10. The method as claimed in claim 1 wherein the detecting step further comprises detecting high voltage through a pin of a universal serial bus (USB) connector connecting to the peripheral electronic device.

11. The method as claimed in claim 1 wherein the peripheral electronic device is a mobile phone or a personal digital assistant (PDA).

12. A peripheral electronic device comprising:

a display;

a non-volatile storage device storing instructions; and a processing unit coupled to the non-volatile storage device and the display, the processing unit being configured to execute the instructions causing the peripheral electronic device to detect that the peripheral electronic device has connected to a computer system, generate a man-machine interface (MMI) comprising a plurality of menu items displayed on the display, wherein each menu item corresponds to one of a plurality of mass storage drivers pre-stored in the computer system, determine one of the mass storage drivers via the MMI, transmit a first configuration descriptor identifying the connected peripheral electronic device as a mass storage device to direct the computer to active the operating system (OS) built-in mass storage driver when determining the OS built-in driver, and transmit a second configuration descriptor identifying the connected peripheral electronic device as a vendor-specific device to direct the computer system to activate the vendor proprietary mass storage driver when determining the vendor proprietary driver, thereby enabling the computer system to read or write data from or to the non-volatile storage device via the activated mass storage driver.

13. The peripheral electronic device as claimed in claim 12 wherein the processing unit further includes instructions to cause the peripheral electronic device to configure at least one software module to be executed for the determined mass storage driver.

14. The peripheral electronic device as claimed in claim 13 wherein the processing unit further includes instructions to cause the peripheral electronic device to disable a file system to prevent the file system from reading or writing data from or to the non-volatile storage device, and configure a command processing engine to parse and convert a small computer system interface (SCSI) or an integrated device electronics (IDE) command received from the activated mass storage driver into a data access command recognized by a storage device driver corresponding to the non-volatile storage device and to issue the converted data access command to the storage device driver to read or write data from or to the non-volatile storage device.

15. The peripheral electronic device as claimed in claim 14 wherein data/voice communication between the peripheral electronic device and a remote electronic device is disabled when the file system is disabled.

16. The peripheral electronic device as claimed in claim 13 wherein the non-volatile storage device comprises a first non-volatile storage device and a second non-volatile storage device, and the processing unit further includes instructions to cause the peripheral electronic device to configure a file system to read or write data from or to the first non-volatile storage device disposed on the peripheral electronic device and configure a command processing engine to parse and convert a small computer system interface (SCSI) or an integrated device electronics (IDE) command received from the activated mass storage driver into a data access command recognized by a storage device driver corresponding to the second non-volatile storage device and to issue the converted data access command to the storage device driver to read or write data from or to the second non-volatile storage device.

17. The peripheral electronic device as claimed in claim 13 wherein the processing unit further includes instructions to cause the peripheral electronic device to configure a command processing engine to transfer a data access command recognized by a file system and received from the activated mass storage driver to the file system, thereby enabling the file system to read or write data from or to the non-volatile storage device according to the transferred data access command.

18. The peripheral electronic device as claimed in claim 17 wherein a man-machine interface (MMI) or an application executed by the processing unit causes data to be read or written from or to the non-volatile storage device via the file system during data/voice communication between the peripheral electronic device and a remote electronic device, enabling the peripheral electronic device to continuously communicate with the remote electronic device while reading or writing data from or to the non-volatile storage device.

19. The peripheral electronic device as claimed in claim 13 wherein the processing unit further includes instructions to cause the peripheral electronic device to configure a command processing engine to transfer an Advanced Technology (AT) command received from the activated mass storage driver to an AT parser, enabling the AT parser to parse and convert the AT command into a data access command and direct a file system to read or write data from or to the non-volatile storage device according to the converted data access command.

20. The peripheral electronic device as claimed in claim 19 wherein a man-machine interface (MMI) or an application executed by the processing unit causes data to be read or written from or to the non-volatile storage device via the file system during data/voice communication between the peripheral electronic device and a remote electronic device, enabling the peripheral electronic device to continuously communicate with the remote electronic device while reading or writing data from or to the non-volatile storage device.

21. The peripheral electronic device as claimed in claim 12 wherein the processing unit further includes instructions to cause the peripheral electronic device to detect high voltage through a pin of a universal serial bus (USB) connector connecting to the peripheral electronic device.

22. The peripheral electronic device as claimed in claim 12 is a mobile phone or a digital personal assistant (PDA).

* * * * *